Patented Oct. 17, 1933

1,930,895

UNITED STATES PATENT OFFICE 1,930,895

CELLULOSE ESTERS AND PROCESS OF MAKING SAME

Robert Haller, Riehen, near Basel, and Andreas Ruperti, Basel, Switzerland, assignors to Society of Chemical Industry in Basle, Basel, Switzerland No Drawing. Application February 7, 1931, Serial No. 514,307, and in Switzerland February 13, 1930

13 Claims. (Cl. 260—101)

The present invention relates to the manufacture of new cellulose esters. It comprises the process of making these esters, as well as the esters themselves.

It has been shown by Cross & Bevan (Researches I 1893–1900, page 40) that when cellulose is heated to boiling with acetic anhydride in presence of anhydrous sodium acetate, the structure of the fiber is retained while apparently a cellulose mono-acetate is produced.

This acetylation in presence of sodium acetate, however, proceeds only with great difficulty.

The present invention is based on the surprising observation that when cellulose is esterified in the presence of potassium acetate or a potassium salt of another weak acid, such as carbonic acid, butyric acid, stearic acid, sulfurous acid, the reaction is remarkably favored in that without previous conversion to alkali cellulose or the use of an acid catalyst, such as $H_2SO_4$, $ZnCl_2$, $SO_2Cl_2$ etc., there may be obtained easily by means of acetic anhydride or another aliphatic acid anhydride, such as the anhydride of propionic acid, butyric acid, valeric acid, isovaleric acid, monochloracetic acid etc., not only monoacidyl cellulose but also di-acidyl cellulose, and even further esterified cellulose. The esterification occurs already in a short time and at moderate temperature. Particularly favorable results are obtained by impregnating the cellulose with the potassium salt, then drying and then esterifying; in some cases it is desirable to cause the cellulose to swell by suitable treatment (for example with alkali solution, acid, or a concentrated solution of a salt) before the impregnation. In this case the washed material, without drying, is impregnated in swollen condition with the solution of potassium salt and only then dried.

The operation of esterification may be promoted by the addition of a tertiary organic base to the acidylating liquid; it is thus possible to attain the same degree of esterification under milder conditions, for example by operating at a lower temperature.

Since the esterification is conducted in absence of acid catalysts and, in particular, substances which hydrolyze cellulose, there are obtained according to this invention esters of the cellulosic parent material without this material being degraded to a substance showing a mentionable reduction action with Fehling's solution, as is the case, for example, in the manufacture of the usual acetylcelluloses in the industry of artificial silk. A further property of these esters of non-degraded cellulose based upon the insignificant attack of the cellulosic parent material consists in their insolubility in the usual organic solvents, even when far-reaching esterification having taken place. As shown hereinafter a series of very good properties of cellulose ester silk made from artificial silk according to this invention is due to the cause referred to above.

By esterifying according to this invention, the dyeing properties of cellulose fiber may be profoundly altered, for instance, in the sense that the fiber is completely reserved to substantive dyestuffs. But of quite special value is the application of the process for improving the properties of materials which consist of regenerated cellulose, such as cellulose artificial silk, by introducing 1-2 acidyl-groups (for instance, acetyl-groups) per $C_6H_{10}O_5$ unit in a cellulose artificial silk. The latter not only acquires the dyeing properties of ester silk in full degree but also the better mechanical properties thereof, in particular the high wet tenacity. The material obtained according to the conditions of manufacture selected or the subsequent treatment, may have a completely matte, voluminous, more or less woolly appearance, or a highly lustrous, smooth appearance, and all intermediate stages between these extremes can easily be secured. For example, the lustre of an artificial silk which has become matte on esterification can easily be completely or in part restored by treatment with a swelling agent (such as an organic acid, a salt solution or an organic solvent). In contrast with acetate silk, the new material is insoluble in organic solvents, is much less affected by ironing and does not become matte when boiled with water. Owing to these properties it may be used in mixed fabrics for obtaining manifold effects.

The esterification of the cellulose artificial silk according to this invention may obviously be applied as an intermediate operation in the manufacture or working up of the silk; for example viscose silk may be treated by the invention before or after the desulfurizing operation or before or after the bleaching operation. Also finished fabrics or dyed materials may be esterified by the invention.

The process may also be applied to esters and ethers of cellulose which still contain free hydroxyl groups.

In the process in accordance with the invention cellulose esters derived from acids other than acetic acid may be made so that one is in a position to impart to cellulose materials further properties which are superior to those of acetate silk. Thus for instance a textile material (whether artificial silk or vegetable fiber) which has been esterified in accordance with the invention by means of butyric acid exhibits a very high resistance towards alkali. Even the heated, relatively strongly alkaline vat which is used for dyeing with dyestuffs such as Cibanone blue RSN (see Colour Index 1106) has no saponifying action on a butyrylated material. By reason of this property it is possible, without special precautions, to use butyrylated fibers for producing effect threads, not only in dyeing with substantive dyestuffs, but also in dyeing with vat dyestuffs, since the majority of dyestuffs of both these classes are not taken up by the butyrylated material.

The process in accordance with the invention may also be applied in conjunction with printing, especially in the printing of artificial silk, thus by printing on a fabric a thickened solution of a suitable potassium salt, and subjecting the printed material to the action of a suitable acid anhydride, esterification occurs only at the printed portions. When this process is used for printing on artificial silk, the esterified portions of the fabric appear as a matte pattern contrasting with the remainder of the material which is unchanged. In this manner there may be obtained beautiful damask effects. The process may be applied not only to undyed artificial silk, but also to artificial silk which has been dyed with a suitable dyestuff. Furthermore a suitable dyestuff, for example, a substantive dyestuff or a vat dyestuff may be incorporated in the printing color. Since the esterified portions of the fabric have dyeing properties which differ from those of the unaltered artificial silk in that they are dyed by dyestuffs for cellulose esters but are indifferent to substantive dyestuffs, it is possible by subsequently dyeing the printed and acidylated material to produce various one-color and two-color effects.

The following examples illustrate the invention, the parts being by weight:—

Example 1

100 parts of cotton yarn are introduced into 1000 parts of a potassium acetate solution of 50 per cent. strength, removed after ½ hour, centrifuged and suspended in a drying chest until the material feels quite dry. The dried yarn is introduced into 2000 parts of acetic anhydride, to which some potassium acetate may have been added, and the whole is heated for ½ hour to 1 hour at 125–135° C. The liquid is then drawn off and recovered, the acetic anhydride still adhering to the yarn is evaporated in a vacuum and the yarn is washed, if necessary soaped, and dried. The material has approximately the composition of cellulose monoacetate. It has a pronounced affinity for acetate silk dyestuffs while it is completely reserved to substantive dyestuffs.

Example 2

100 parts of cotton are introduced into 1000 parts of a caustic potash solution of 25 per cent. strength at the ordinary temperature, removed after 1 hour, separated from the adhering solution as far as possible by centrifuging or pressing, and washed with cold water until completely free from alkali solution. The washed and centrifuged material, without drying, is immersed in 1000 parts of a saturated solution of potassium acetate. After 1 hour the material is removed, centrifuged and dried in a drying chest at about 70–80° C. The dried material is introduced into 2000 parts of acetic anhydride and the whole is heated for 1 hour to 100–105° C. The liquid is withdrawn hot and the excess of anhydride recovered. The cellulose material, in some cases after evaporation in a vacuum of the still adhering liquid, is washed with water and dried. There are thus obtained 150–160 parts of an ester which contains more than two acetyl-groups per $C_6H_{10}O_5$ unit; the original fibrous structure of the material is completely retained and the material is insoluble in organic solvents. The product thus obtained is specially suitable as a parent material for the manufacture of further conversion products of cellulose. Similar results are obtained if the cellulose is swollen by means of nitric acid or calcium sulfocyanide solution.

Example 3

100 parts of viscose silk or cuprammonium silk are immersed in 1000 parts of a potassium acetate solution of 60 per cent. strength at the room temperature. After 1 hour the yarn is removed, freed from excess of liquid by centrifuging and suspended in a drying chest until it feels quite dry. The dry yarn is immersed in 2000 parts of a solution consisting of 4 parts by volume of benzene and 1 part by volume of acetic anhydride. The solution is heated to boiling and kept at boiling temperature for an hour. Instead of benzene, another solvent can be used with like result, such as toluene, xylene, carbon tetrachloride or the like, provided that the operation is conducted at the same temperature. In the course of 1 hour the liquid is allowed to cool and the yarn removed. The still adhering liquid is separated by centrifuging and washing hot. In this manner there are obtained about 135 parts of a partially acetylated material, the acetyl-content of which corresponds with about 1½ acetyl-groups per $C_6H_{10}O_5$-unit. In spite of the low acetyl content in comparison with acetate silk, this material exhibits the dyeing properties of the latter. It is reserved to substantive dyestuffs but dyed by acetate silk dyestuffs with the same or even greater intensity than acetate silk is dyed. The dry tenacity of the material is increased correspondingly with the increase of the titre, while the wet tenacity is increased in a considerably higher degree. The external appearance of the material is more or less changed. There is a strong increase in volume without any notable shortening of the skein. The lustre becomes more or less matte according to the material used.

For producing a lustre on the material, the following operation may be applied:—

The finished, washed and dried material is immersed in an acetic acid of 80 per cent. strength for 1–12 hours. It is then removed and, after separation of the acetic acid by evaporation in a vacuum at the ordinary temperature, is washed with cold water, if necessary treated in a soap bath at 50° C. and then rinsed and dried. By this treatment the original lustre of the viscose silk is completely restored without damage to the remaining properties of the new artificial silk material. Indeed, there is even a considerable increase in the properties of tenacity usually measured. In particular, the wet tenacity is considerably increased as compared with that of the untreated viscose. Instead of acetic acid of 80 per cent. strength, a weaker acid, such as that of 30 or 50 per cent. strength, may be used, in which case a lower degree of lustre is obtained. The lustre does not suffer in any way when the silk is boiled in water for several hours.

If it is desired to produce directly a lustrous material, the procedure may be as follows:—100 parts of artificial silk which have been impregnated with potassium acetate and dried, are immersed in 1200 parts of acetic anhydride and the whole is heated on a water-bath for one hour. The acetylation liquid is then drawn off and may be used for a further esterification either directly or after removing by filtration the crystals of acid potassium acetate which separate on cooling. The artificial silk is first freed from the adhering acetic anhydride by washing with glacial acetic acid or another suitable liquid, and is then washed with water, centrifuged and dried. There are thus obtained about 140 parts of an esterified artificial silk having the lustre of the parent artificial silk and otherwise having the properties of the esterified artificial silk obtained in the manner described in the first part of this example.

Example 4

100 parts of viscose silk are immersed in 1000 parts of a solution of potassium carbonate of 50 per cent. strength, removed after 1 hour, centrifuged, dried and further treated exactly as described in the first paragraph of Example 3, with the single difference that the acetylation is conducted with a boiling solution of acetic anhydride in toluene, instead of in benzene. The material obtained resembles that produced by Example 3.

Example 5

100 parts of viscose silk are immersed without any preliminary treatment in a mixture consisting of 500 parts of acetic anhydride, 70 parts of potassium acetate and 1700 parts of xylene, the whole being heated to boiling for 1 hour. The silk is removed, freed in a vacuum from still adhering liquid, washed and dried. There are obtained about 140 parts of an acetylated artificial silk, of which the properties are similar to those of the material obtained by Example 3.

By substituting for the potassium acetate an equivalent quantity of a potassium salt of another feeble acid, such as potassium palmitate, a like result is obtained.

Example 6

100 parts of viscose silk are immersed in 1000 parts of potassium acetate solution of 60 per cent. strength at the room temperature. After 1 hour, the yarn is removed, freed from excess of liquid by centrifuging and suspended in a drying chest until the feel is quite dry. The dried yarn is immersed in a solution of 500 parts of butyric anhydride in 2000 parts of xylene. The solution is heated to boiling and retained at the boiling point for about 1 hour. The artificial silk is then removed, centrifuged, washed, soaped, rinsed and dried. There are obtained about 165 parts of an ester silk which has properties similar to those of the acetylated viscose obtained as described in the first paragraph of Example 3 with the exception that the material has a substantially higher resistance towards alkali and a very soft feel. It is completely reserved not only against substantive dyestuffs but also against most vat dyestuffs.

In all these examples the material treated may have been already dyed not only with vat-dyestuffs, such as Cibanone blue RS, but with direct dyestuffs, such as direct scarlet SE, and other dyestuffs suitable for dyeing cellulose materials, provided that such dyestuffs are not destroyed or stripped by the treatment in question.

Example 7

100 parts of artificial silk which has been impregnated in the manner rescribed in Example 3 with potassium acetate and dried, are immersed in a mixture of 500 parts of butyric acid anhydride, 250 parts of pyridine and 1250 parts of carbon tetrachloride, and the whole is heated to boiling for 5 hours. The liquid is then drawn off and may be used for a further operation. The artificial silk is washed first with carbon tetrachloride or with glacial acetic acid and then with water; it is then soaped at the boil, rinsed, centrifuged and dried. There are obtained about 155 parts of a material having properties analogous to those of the esterified artificial silk obtainable in the manner described in Example 6.

Example 8

100 parts of artificial silk which have been impregnated in the manner described in Example 3 with potassium acetate and dried are treated for one hour at 120° C. in a mixture of 750 parts of pyridine and 1500 parts of the mixed anhydride of stearic acid and acetic acid. The liquid is drawn off whilst it is still hot, and the artificial silk material is washed with water. There are obtained about 170 parts of a matte material resembling wool; it is of a very voluminous character and has a very soft and warm feel. Its dyeing properties are analogous to those of the material obtainable as described in Example 3.

Example 9

100 parts of cotton in the form of yarn, loose material or linters are immersed in 1000 parts of mercerizing caustic soda solution at room temperature. After one hour, the cotton is removed, pressed, washed free from alkali and centrifuged. The material is now, without previous drying, introduced into 1000 parts of a concentrated potassium acetate solution, for instance of 60 per cent. strength, left therein until there is equilibrium of concentration, then removed, centrifuged and dried at a temperature not too high, for instance at 70° C. The cotton thus treated is introduced into 600 parts of chloracetic anhydride dissolved in 1400 parts of xylene and the solution is then boiled in a reflux apparatus for 1 hour; the material is then removed from the solution, the adhering liquid separated by suction, washed with an organic solvent (for instance glacial acetic acid) and finally with water, and the material is dried. There are obtained about 220 parts of a strongly esterified material which contains 22-25 per cent. of chlorine. This chloracetylated cotton retains completely the fibrous structure of the material. In its dyeing properties it resembles the cotton which has been esterified by the same process but with non-substituted acetic anhydride. It is reserved to substantive dyestuffs and dyed by means of acetate silk dyestuffs. To basic dyestuffs it shows no greater affinity, and in part even less, than is shown by the parent cotton. It is insoluble in the usual solvents.

Example 10

100 parts of artificial silk (viscose silk, Chardonnet silk or cuprammonium silk) are immersed in 1000 parts of potassium acetate solution of 60 per cent. strength, removed after 1 hour, centrifuged and dried at a temperature not too high, for instance 70° C. The dry material is immersed in a solution consisting of 400 parts of chloracetic anhydride and 1400 parts of benzene, the liquid being heated to boiling in a reflux apparatus for 1 hour. The artificial silk is then removed, centrifuged, washed with water and dried. Before the washing, the still adhering liquid and the potassium acetate may be extracted by means of glacial acetic acid. About 170 parts of an artificial silk are obtained, which contain about 1½ acyl-groups per $C_6H_{10}O_5$ unit. In comparison with the parent viscose silk, the new product has an enhanced wet tenacity and has the dyeing properties of the chloracetylated cotton described in the preceding example.

Example 11

100 parts of artificial silk (viscose silk, Chardonnet silk or cuprammonium silk) are impregnated as in the previous example with potassium acetate, dried and heated for ½ hour on the water-bath with 2000 parts of a solution of chloracetic anhydride in acetic anhydride, the solution being of 4 per cent. strength. The silk is then removed, washed first with glacial acetic acid and then with water, and dried. 145–150 parts of the material are obtained which contain about 6 per cent. of chlorine. By varying the proportion of chloracetic anhydride and of the acetic anhydride, the chlorine content of the product can be varied as desired.

Example 12

100 parts of twisted acetate silk are immersed for 1–2 hours in a potassium acetate solution of 60 per cent. strength. Then well pressed or centrifuged and dried at a raised temperature.

The acetyl cellulose thus impregnated with potassium acetate is heated with a solution of 100 parts of chloracetic anhydride in 700 parts of toluene for 16 hours at 50–60° C., pressed, if necessary extracted, well washed and dried. The material containing chlorine thus obtained, as compared with the parent material, has a smaller affinity to dyestuffs. It is, however, in itself a valuable parent material for making further artificial fibers.

Example 13

A thickened solution of potassium acetate is printed on an artificial silk material. The printing color may, for example, have the following composition:

| | Parts |
|---|---|
| Potassium acetate | 600 |
| Tragacanth | 40 |
| Water | 360 |

The printed material is dried and introduced into the acidylating bath; for example, for producing acetylation it may be treated for half an hour on a water bath with a solution of 20 per cent. strength of acetic anhydride in toluene. The esterification may also be promoted by the addition of a tertiary organic base. After the acetylation the material is immediately washed with hot water and dried. Esterification occurs only at the printed places of the fabric, which appear after washing in the form of a matte pattern. For producing a one-color or two-color pattern, the printed and acidylated material may for example be dyed as follows:—Dyeing is conducted with 1 per cent. of Cibacet violet 2R, with the addition of 2–3 grams of soap per litre of dyebath. The material is entered at 40° C. and dyeing is conducted for one hour, during which period the temperature is raised to 80° C. If it is desired to produce a two-color effect there may be added to the dye liquor for example 1 per cent. of Chlorantin light green BL; when the Cibacet dyestuff has been nearly completely absorbed there are added to the bath 10–40 per cent. of Glauber's salt, and dyeing is completed at 90° C. The esterified portions appear in the dyed material as a violet pattern on a green ground.

Example 14

Artificial silk is printed with a printing color of the following composition:—

| | Grams |
|---|---|
| Tragacanth thickening (10 per cent.) | 100 |
| Cibanone yellow GN paste (see Colour Index No. 1118) | 20 |
| Potassium carbonate | 15 |
| Hydrosulfite R concentrated | 15 |
| Water | 20 |
| Potassium acetate | 200 |
| | 370 |

The material is steamed for 5 minutes in a Mather-Platt apparatus, dried and acetylated in the manner described in Example 13. The printed portions appear as a yellow pattern and at the same time have the property that they are indifferent to substantive dyestuffs. If now the fabric be dyed with a substantive dyestuff there is obtained a pattern in two colors, since the printed places are not dyed by the substantive dyestuff.

Example 15

Cotton yarn or artificial silk yarn which has been treated in the manner described in the preceding examples is dyed in the following manner with a dyestuff for acetate silk, for example Cibacet red 3B. Dyeing is conducted with 2 per cent. of the dyestuff calculated on the weight of the yarn, 2–3 grams of soap being added per litre of dyebath. The material is entered at 40° C. and dyeing is conducted for one hour during which the temperature is raised to 80° C., the proportion of material to dye liquor being 1 to 30.

Example 16

A mixed fabric made from acetate silk and a viscose which has been treated in the manner described in any of Examples 3 to 6, is treated at boiling temperature for two hours with a soap solution containing 20 grams of neutral soap per litre. By this treatment only the acetate silk assumes a matte appearance, whilst the esterified viscose retains its lustre; characteristic effects are thus produced.

What we claim is:—

1. A process for esterifying cellulose whilst maintaining its structure, which consists in esterifying the cellulose with an aliphatic acid anhydride in the presence of a potassium salt of a weak acid in the absence of an acid catalyst.

2. A process for esterifying cellulose whilst maintaining its structure, which consists in esterifying the cellulose with an aliphatic acid anhydride in the presence of a potassium salt of a weak aliphatic acid in the absence of an acid catalyst.

3. A process for esterifying cellulose fibers whilst maintaining their structure, which consists in esterifying the cellulose fibers with an aliphatic acid anhydride in the presence of a potassium salt of a weak aliphatic acid in the absence of an acid catalyst.

4. A process for esterifying cotton whilst maintaining its structure, which consists in esterifying the cotton with acetic acid anhydride in the presence of potassium acetate in the absence of an acid catalyst.

5. A process for esterifying regenerated cellulose whilst maintaining its structure, which consists in esterifying the regenerated cellulose with an aliphatic acid anhydride in the presence of a potassium salt of a weak acid in the absence of an acid catalyst.

6. A process for esterifying regenerated cellulose whilst maintaining its structure, which consists in esterifying the regenerated cellulose with acetic acid anhydride in the presence of potassium acetate in the absence of an acid catalyst.

7. A process for esterifying regenerated cellulose whilst maintaining its structure, which consists in esterifying the regenerated cellulose with butyric acid anhydride in the presence of potassium acetate in the absence of an acid catalyst.

8. A cellulose ester which is obtained by esterifying the cellulose with an aliphatic acid anhydride in the precence of a potassium salt of a weak acid in the absence of an acid catalyst, which ester is insoluble in chloroform and acetone and constitutes an ester of nondegraded cellulose.

9. A cellulose ester which is obtained by esterifying the cellulose with an aliphatic acid anhydride in the presence of a potassium salt of a weak aliphatic acid in the absence of an acid catalyst, which ester is insoluble in chloroform and acetone and constitutes an ester of non-degraded cellulose.

10. A cellulose ester which is obtained by esterifying regenerated cellulose with an aliphatic acid anhydride in the presence of a potassium salt of a weak acid in the absence of an acid catalyst, which ester is insoluble in chloroform and acetone and constitutes an ester of non-degraded cellulose.

11. A cellulose ester which is obtained by esterifying regenerated cellulose with acetic acid anhydride in the presence of potassium acetate in the absence of an acid catalyst, which ester is insoluble in chloroform and acetone and constitutes an ester of non-degraded cellulose.

12. A cellulose ester which is obtained by esterifying regenerated cellulose with monochloracetic acid anhydride in the presence of potassium acetate in the absence of an acid catalyst, which ester is insoluble in chloroform and acetone and constitutes an ester of non-degraded cellulose.

13. A cellulose ester which is obtained by esterifying regenerated cellulose with butyric acid anhydride in the presence of potassium acetate in the absence of an acid catalyst, which ester is insoluble in chloroform and acetone and constitutes an ester of non-degraded cellulose.

ROBERT HALLER.
ANDREAS RUPERTI.